(12) United States Patent
Swing et al.

(10) Patent No.: US 8,239,724 B2
(45) Date of Patent: Aug. 7, 2012

(54) ERROR CORRECTION FOR A DATA STORAGE DEVICE

(75) Inventors: Andrew T. Swing, Los Gatos, CA (US); Albert T. Borchers, Santa Cruz, CA (US); Robert S. Sprinkle, Mountain View, CA (US); Jason W. Klaus, Brooklyn, NY (US); Thomas J. Norrie, Mountain View, CA (US); Benjamin S. Gelb, San Francisco, CA (US)

(73) Assignee: Google Inc., Mountain View, CA (US)

( * ) Notice: Subject to any disclaimer, the term of this patent is extended or adjusted under 35 U.S.C. 154(b) by 424 days.

(21) Appl. No.: 12/537,725

(22) Filed: Aug. 7, 2009

(65) Prior Publication Data

US 2010/0262894 A1    Oct. 14, 2010

Related U.S. Application Data

(60) Provisional application No. 61/187,835, filed on Jun. 17, 2009, provisional application No. 61/167,709, filed on Apr. 8, 2009.

(51) Int. Cl.
*H03M 13/00*    (2006.01)

(52) U.S. Cl. ....................................... 714/752

(58) Field of Classification Search .......................... None
See application file for complete search history.

(56) References Cited

U.S. PATENT DOCUMENTS

| | | |
|---|---|---|
| 4,449,182 A | 5/1984 | Rubinson et al. |
| 4,777,595 A | 10/1988 | Strecker et al. |
| 5,619,687 A | 4/1997 | Langan et al. |
| 5,708,814 A | 1/1998 | Short et al. |
| 5,802,345 A | 9/1998 | Matsunami et al. |
| 5,844,776 A | 12/1998 | Yamaguchi et al. |
| 5,941,998 A | 8/1999 | Tillson |

(Continued)

FOREIGN PATENT DOCUMENTS

EP    1736885 A2    12/2006

(Continued)

OTHER PUBLICATIONS

International Search Report and Written Opinion received for PCT Application No. PCT/US2010/029677, mailed on Jul. 5, 2010, 13 pages.

(Continued)

*Primary Examiner* — Guerrier Merant
(74) *Attorney, Agent, or Firm* — Brake Hughes Bellermann LLP (57) ABSTRACT

An apparatus for error correction for a data storage device may include an input interface that is configured to receive individual error correction requests to correct data from multiple channel controllers and that is configured to receive error correction information corresponding to the error correction requests, where each of the channel controllers is arranged and configured to control operations associated with one or more memory chips. The apparatus may include a corrector module that is operably coupled to the input interface and that is arranged and configured to perform error correction using an error correction algorithm and the error correction information to generate correction solutions, where the corrector module is a shared resource for the multiple channel controllers. The apparatus may include an output interface that is operably coupled to the corrector module and that is arranged and configured to communicate the correction solutions to the channel controllers.

30 Claims, 6 Drawing Sheets

U.S. PATENT DOCUMENTS

| | | | |
|---|---|---|---|
| 6,003,112 A | 12/1999 | Tetrick | |
| 6,009,478 A | 12/1999 | Panner et al. | |
| 6,167,338 A | 12/2000 | De Wille et al. | |
| 6,343,660 B1 | 2/2002 | Mutsears | |
| 6,640,290 B1 | 10/2003 | Forin et al. | |
| 6,678,463 B1 | 1/2004 | Pierre et al. | |
| 6,697,284 B2 | 2/2004 | Marotta | |
| 6,757,797 B1 | 6/2004 | Kaiya et al. | |
| 6,854,022 B1 | 2/2005 | Thelin | |
| 6,868,007 B2 | 3/2005 | Hasegawa et al. | |
| 6,938,188 B1 | 8/2005 | Kelleher | |
| 6,982,919 B2 | 1/2006 | Kumhara et al. | |
| 7,000,245 B1 | 2/2006 | Pierre et al. | |
| 7,012,632 B2 | 3/2006 | Freeman et al. | |
| 7,028,137 B2 | 4/2006 | Nashimoto et al. | |
| 7,080,245 B2 | 7/2006 | Ballard et al. | |
| 7,080,377 B2 | 7/2006 | Peled et al. | |
| 7,088,387 B1 | 8/2006 | Freeman et al. | |
| 7,114,051 B2 | 9/2006 | Guu et al. | |
| 7,127,549 B2 | 10/2006 | Sinclair | |
| 7,127,551 B2 | 10/2006 | Beck | |
| 7,158,167 B1 | 1/2007 | Yerazunis et al. | |
| 7,161,834 B2 | 1/2007 | Kumahara et al. | |
| 7,225,289 B2 | 5/2007 | Tee et al. | |
| 7,296,213 B2 * | 11/2007 | Vainsencher et al. | 714/784 |
| 7,310,699 B2 | 12/2007 | Sinclair | |
| 7,328,304 B2 | 2/2008 | Royer, Jr. et al. | |
| 7,356,637 B2 | 4/2008 | Tee et al. | |
| 7,370,230 B1 | 5/2008 | Flake | |
| 7,392,367 B2 | 6/2008 | Clark et al. | |
| 7,406,572 B1 | 7/2008 | Nguyen | |
| 7,546,393 B2 | 6/2009 | Day et al. | |
| 7,562,366 B2 | 7/2009 | Pope et al. | |
| 7,631,084 B2 | 12/2009 | Thomas et al. | |
| 7,660,306 B1 | 2/2010 | Eriksson et al. | |
| 7,668,177 B1 | 2/2010 | Trapp et al. | |
| 7,730,257 B2 | 6/2010 | Franklin | |
| 7,836,378 B2 * | 11/2010 | Shaeffer et al. | 714/763 |
| 7,865,809 B1 * | 1/2011 | Lee et al. | 714/782 |
| 7,904,639 B2 | 3/2011 | Kim et al. | |
| 8,037,234 B2 | 10/2011 | Yu et al. | |
| 8,086,936 B2 * | 12/2011 | Gower et al. | 714/763 |
| 2001/0023472 A1 | 9/2001 | Kubushiro et al. | |
| 2002/0005895 A1 | 1/2002 | Freeman et al. | |
| 2002/0053004 A1 | 5/2002 | Pong | |
| 2002/0078285 A1 | 6/2002 | Hofstee et al. | |
| 2003/0058689 A1 | 3/2003 | Marotta | |
| 2003/0101327 A1 | 5/2003 | Beck | |
| 2003/0117846 A1 | 6/2003 | Hasegawa et al. | |
| 2003/0208771 A1 | 11/2003 | Hensgen et al. | |
| 2003/0221092 A1 | 11/2003 | Ballard et al. | |
| 2003/0225960 A1 | 12/2003 | Guu et al. | |
| 2004/0049649 A1 | 3/2004 | Durrant | |
| 2004/0078729 A1 | 4/2004 | Peter | |
| 2005/0041509 A1 | 2/2005 | Kumahara et al. | |
| 2005/0160218 A1 | 7/2005 | See et al. | |
| 2005/0172067 A1 | 8/2005 | Sinclair | |
| 2005/0172087 A1 | 8/2005 | Klingman | |
| 2005/0177698 A1 | 8/2005 | Ku et al. | |
| 2005/0193164 A1 | 9/2005 | Royer et al. | |
| 2006/0053308 A1 | 3/2006 | Zimmerman | |
| 2006/0062052 A1 | 3/2006 | Kumahara et al. | |
| 2006/0123284 A1 | 6/2006 | Hwang et al. | |
| 2006/0206653 A1 | 9/2006 | Tee et al. | |
| 2007/0008801 A1 | 1/2007 | Chiang et al. | |
| 2007/0028040 A1 | 2/2007 | Sinclair | |
| 2007/0101238 A1 * | 5/2007 | Resnick et al. | 714/763 |
| 2007/0113150 A1 * | 5/2007 | Resnick et al. | 714/763 |
| 2007/0198796 A1 | 8/2007 | Warren, Jr. | |
| 2007/0208900 A1 | 9/2007 | Tee et al. | |
| 2007/0255890 A1 | 11/2007 | Urata et al. | |
| 2007/0255981 A1 * | 11/2007 | Eto | 714/710 |
| 2007/0288686 A1 | 12/2007 | Arcedera et al. | |
| 2007/0288692 A1 | 12/2007 | Bruce et al. | |
| 2008/0010431 A1 | 1/2008 | Chang et al. | |
| 2008/0022186 A1 * | 1/2008 | Co et al. | 714/763 |
| 2008/0040531 A1 | 2/2008 | Anderson | |
| 2008/0052448 A1 | 2/2008 | Minz et al. | |
| 2008/0052449 A1 | 2/2008 | Kim et al. | |
| 2008/0052451 A1 | 2/2008 | Pua et al. | |
| 2008/0059747 A1 | 3/2008 | Burckart et al. | |
| 2008/0065815 A1 | 3/2008 | Nasu et al. | |
| 2008/0077727 A1 | 3/2008 | Baca et al. | |
| 2008/0126658 A1 | 5/2008 | Wang | |
| 2008/0147931 A1 | 6/2008 | McDaniel et al. | |
| 2008/0155160 A1 | 6/2008 | McDaniel | |
| 2008/0163030 A1 | 7/2008 | Lee | |
| 2008/0178025 A1 | 7/2008 | Hand et al. | |
| 2008/0209157 A1 | 8/2008 | Weng | |
| 2008/0222491 A1 | 9/2008 | Lee et al. | |
| 2008/0235467 A1 | 9/2008 | Tagawa | |
| 2008/0288814 A1 * | 11/2008 | Kitahara | 714/5 |
| 2008/0294814 A1 | 11/2008 | Gorobets | |
| 2008/0301349 A1 | 12/2008 | Bacha | |
| 2008/0301381 A1 | 12/2008 | Lee et al. | |
| 2008/0320214 A1 | 12/2008 | Ma et al. | |
| 2009/0006720 A1 | 1/2009 | Traister | |
| 2009/0037652 A1 | 2/2009 | Yu et al. | |
| 2009/0044078 A1 * | 2/2009 | Vogan et al. | 714/773 |
| 2009/0055590 A1 | 2/2009 | Takahashi | |
| 2009/0063895 A1 | 3/2009 | Smith | |
| 2009/0063922 A1 * | 3/2009 | Gower et al. | 714/746 |
| 2009/0063934 A1 * | 3/2009 | Jo | 714/764 |
| 2009/0119443 A1 * | 5/2009 | Tremaine | 711/6 |
| 2009/0125785 A1 | 5/2009 | Gorobets et al. | |
| 2009/0125790 A1 * | 5/2009 | Iyer et al. | 714/773 |
| 2009/0240873 A1 | 9/2009 | Yu et al. | |
| 2009/0265513 A1 * | 10/2009 | Ryu | 711/149 |
| 2010/0153660 A1 | 6/2010 | Lasser et al. | |
| 2010/0211737 A1 | 8/2010 | Flynn et al. | |
| 2010/0262738 A1 | 10/2010 | Swing et al. | |
| 2010/0262740 A1 | 10/2010 | Borchers et al. | |
| 2010/0262757 A1 | 10/2010 | Sprinkle et al. | |
| 2010/0262758 A1 | 10/2010 | Swing et al. | |
| 2010/0262759 A1 | 10/2010 | Borchers et al. | |
| 2010/0262760 A1 | 10/2010 | Swing et al. | |
| 2010/0262761 A1 | 10/2010 | Borchers et al. | |
| 2010/0262762 A1 | 10/2010 | Borchers et al. | |
| 2010/0262766 A1 | 10/2010 | Sprinkle et al. | |
| 2010/0262767 A1 | 10/2010 | Borchers et al. | |
| 2010/0262773 A1 | 10/2010 | Borchers et al. | |
| 2010/0262979 A1 | 10/2010 | Borchers et al. | |
| 2010/0269015 A1 | 10/2010 | Borchers et al. | |
| 2010/0287217 A1 | 11/2010 | Borchers et al. | |
| 2011/0191554 A1 | 8/2011 | Sakai | |
| 2011/0213921 A1 | 9/2011 | Yu et al. | |
| 2011/0238885 A1 | 9/2011 | Kitahara et al. | |
| 2012/0030416 A1 | 2/2012 | Borchers et al. | |
| 2012/0030507 A1 | 2/2012 | Borchers et al. | |
| 2012/0030542 A1 | 2/2012 | Borchers et al. | |

FOREIGN PATENT DOCUMENTS

| | | |
|---|---|---|
| JP | 2004-071033 | 3/2004 |
| WO | 01/33852 A1 | 5/2001 |
| WO | 01/90900 A1 | 11/2001 |
| WO | 02/03388 A2 | 1/2002 |
| WO | 02/11424 A2 | 2/2002 |
| WO | 02/058383 A1 | 7/2002 |
| WO | 2005/081097 A2 | 9/2005 |
| WO | 2005/093588 A2 | 10/2005 |
| WO | 2005/081097 A3 | 11/2005 |
| WO | 2005/093588 A3 | 12/2006 |
| WO | 2007/072313 A2 | 6/2007 |
| WO | 2007/072317 A2 | 6/2007 |
| WO | 2007/072317 A3 | 8/2007 |
| WO | 2007/096844 A2 | 8/2007 |
| WO | 2007/096844 A3 | 8/2007 |
| WO | 2007/146756 A2 | 12/2007 |
| WO | 2007/146845 A2 | 12/2007 |
| WO | 2008/022094 A2 | 2/2008 |
| WO | 2008/040028 A2 | 4/2008 |
| WO | 2008/025238 A1 | 6/2008 |
| WO | 2008/147752 A1 | 12/2008 |
| WO | 2010/117877 A1 | 10/2010 |
| WO | 2010/117878 A1 | 10/2010 |

OTHER PUBLICATIONS

International Search Report and Written Opinion received for PCT Application No. PCT/US2010/029679, mailed on Jul. 5, 2010, 20 pages.
International Search Report and Written Opinion received for PCT Application No. PCT/US2010/029916, mailed on Jul. 7, 2010, 14 pages.
International Search Report and Written Opinion received for PCT Application No. PCT/US2010/029917, mailed on Jul. 28, 2010, 19 pages.
International Search Report and Written Opinion received for PCT Application No. PCT/US2010/029919, mailed on Jul. 28, 2010, 11 pages.
International Search Report and Written Opinion received for PCT Application No. PCT/US2010/030389, mailed on Jul. 21, 2010, 11 pages.
U.S. Appl. No. 12/537,733, filed Aug. 7, 2009.
U.S. Appl. No. 12/537,727, filed Aug. 7, 2009.
U.S. Appl. No. 12/537,725, filed Aug. 7, 2009.
U.S. Appl. No. 12/537,722, filed Aug. 7, 2009.
U.S. Appl. No. 12/537,719, filed Aug. 7, 2009.
U.S. Appl. No. 12/756,009, filed Apr. 7, 2010, 35 pages.
U.S. Appl. No. 12/537,709, filed Aug. 7, 2009.
U.S. Appl. No. 12/755,968, filed Apr. 7, 2010, 41 pages.
U.S. Appl. No. 12/755,964, filed Apr. 7, 2010, 44 pages.
U.S. Appl. No. 12/537,748, filed Aug. 7, 2009.
U.S. Appl. No. 12/756,477, filed Apr. 8, 2010, 51 pages.
U.S. Appl. No. 12/756,007, filed Apr. 7, 2010, 54 pages.
U.S. Appl. No. 12/537,738, filed Aug. 7, 2009.
Non Final Office Action for U.S. Appl. No. 12/537,727, mailed on Dec. 13, 2010, 20 pages.
Non-Final Office Action for U.S. Appl. No. 12/537,727, mailed on Jun. 3, 2011, 15 pages.
Non-Final Office Action Response for U.S. Appl. No. 12/537,727, filed on Mar. 14, 2011, 11 pages.
Non-Final Office Action for U.S. Appl. No. 12/755,968, mailed Jan. 26, 2012, 32 pages.
Non-Final Office Action for U.S. Appl. No. 13/269,985, mailed Jan. 6, 2012, 24 pages.
Non-Final Office Action for U.S. Appl. No. 12/537,709, mailed Dec. 19, 2011, 28 pages.
Non-Final Office Action for U.S. Appl. No. 12/537,719, mailed Nov. 30, 2011, 29 pages.
Final Office Action for U.S. Appl. No. 12/537,704, mailed Apr. 6, 2012, 15 pages.
Non-Final Office Action for U.S. Appl. No. 12/537,704, mailed Nov. 28, 2011, 24 pages.
Non-Final Office Action for U.S. Appl. No. 12/537,748, mailed Dec. 12, 2011, 24 pages.
Non-Final Office Action for U.S. Appl. No. 12/537,741, mailed Dec. 21, 2011, 25 pages.
Non-Final Office Action for U.S. Appl. No. 12/537,738, mailed Dec. 12, 2011, 25 pages.
Wen, "A Processor-DMA-Based Memory Copy Hardware Accelerator", 6th IEEE International Conference on Networking, Architecture and Storage (NAS), Jul. 30, 2011, pp. 225-229.
Non-Final Office Action for U.S. Appl. No. 13/269,972, mailed Jan. 5, 2012, 26 pages.
Non-Final Office Action Response for U.S. Appl. No. 12/537,704, filed Feb. 28, 2012, 25 pages.
Non-Final Office Action Response for U.S. Appl. No. 12/537,709, filed Mar. 19, 2012, 25 pages.
Paris, et al, "Evaluating the Impact of Irrecoverable Read Errors on Disk Array Reliability", 15th IEEE Pacific Rim International Symposium on Dependable Computing, Nov. 16-18, 2009, 6 pages.
Takeuchi, "Novel Co-Design of NAND Flash Memory and NAND Flash Controller Circuits for Sub-30 nm Low-Power High-Speed Solid-State Drives (SSD)", IEEE Journal of Solid-State Circuits, vol. 44, No. 4, Apr. 2009, pp. 1227-1234.
Non-Final Office Action Response for U.S. Appl. No. 12/537,719, filed Feb. 29, 2012, 23 pages.
Non-Final Office Action Response for U.S. Appl. No. 12/537,727, filed Aug. 31, 2011, 15 pages.
Non-Final Office Action for U.S. Appl. No. 12/537,727, mailed Nov. 8, 2011, 13 pages.
Non-Final Office Action Response for U.S. Appl. No. 12/537,727, filed Mar. 8, 2012, 22 pages.
Non-Final Office Action for U.S. Appl. No. 12/537,733, mailed Mar. 14, 2012, 23 pages.
Non-Final Office Action Response for U.S. Appl. No. 13/269,183, filed Mar. 27, 2012, 17 pages.
Non-Final Office Action for U.S. Appl. No. 13/269,183, mailed Dec. 27, 2011, 27 pages.
Non-Final Office Action Response for U.S. Appl. No. 13/269,972, filed Apr. 4, 2012, 25 pages.
Non-Final Office Action Response for U.S. Appl. No. 13/269,985, filed Apr. 4, 2012, 26 pages.
Notice of Allowance for U.S. Appl. No. 12/537,709, mailed Apr. 6, 2012, 14 pages.
Final Office Action for U.S. Appl. No. 12/537,719, mailed Apr. 9, 2012, 21 pages.
Non-Final Office Action for U.S. Appl. No. 12/537,722, mailed Dec. 19, 2011, 25 pages.
Notice of Allowance for U.S. Appl. No. 12/537,727, mailed Apr. 24, 2012, 14 pages.
Notice of Allowance for U.S. Appl. No. 12/537,722, mailed May 11, 2012, 14 pages.
Notice of Allowance for U.S. Appl. No. 13/269,972, mailed May 23, 2012, 18 pages.
Non-Final Office Action for U.S. Appl. No. 13/269,985, mailed Jun. 6, 2012, 19 pages.
Notice of Allowance for U.S. Appl. No. 13/269,183, mailed Apr. 19, 2012, 15 pages.
Non-Final Office Action Response for U.S. Appl. No. 12/537,748, filed May 2, 2012, 13 pages.

* cited by examiner

ERROR CORRECTION FOR A DATA STORAGE DEVICE

TECHNICAL FIELD

This description relates to error correction for a data storage device.

BACKGROUND

Data storage devices may be used to store data. A data storage device may be used with a computing device to provide for the data storage needs of the computing device. In certain instances, it may be desirable to store large amounts of data on a data storage device. Also, it may be desirable to execute commands quickly to read data and to write data to the data storage device.

The throughput of the command execution on the data storage device may be related to the number of commands that may be processed by the data storage device. It may be desirable to achieve a high throughput for the data storage device by increasing the number of commands that may be processed by the data storage device. In addition to executing the commands quickly, it may be desirable to execute the commands accurately, such that data errors are minimized and/or the data errors are correctible with at least a minimal impact on data throughput.

SUMMARY

This document describes a corrector module for error correction for a data storage device. The data storage device may include multiple memory devices. As data is written to and read from the memory devices, errors in the data may be detected and error correction requests may be sent to the corrector module. The corrector module may be arranged and configured to perform error correction using an error correction algorithm and to generate correction solutions, where the corrector module is a shared resource for the memory devices. In this manner, errors may be detected locally at the memory devices, but the more intensive error correction calculations may be performed at a shared resource. The correction solutions may be communicated back to the memory devices, where the correction solutions are applied to the data locally. Corrections may be performed on the fly in substantially real time. In one exemplary implementation, the error correction algorithm may include a Bose Chauduri Hocquenghem (BCH) error correction algorithm.

In one exemplary implementation, the data storage device may include multiple channel controllers that are arranged and configured to control operations associated with one or more memory chips. The memory chips may include flash memory chips. Each of the channel controllers may include an encoder that is configured to calculate the error correction code bits for data being written to the memory chips. The channel controllers also may include an error detector module that is configured to detect errors in the data, for example, when the data is being read from the memory chips. If an error is detected, an error correction request may be sent to the corrector module such that the corrector module may generate a correction solution to correct the error. The correction solution may be communicated from the corrector module to the channel controller. The channel controller may include a channel corrector module that is configured to apply the received correction solution to the data. In this manner, errors may be detected locally with the more intensive error correction calculations being performed by a shared corrector module. The correction solutions may then be applied locally at the channel controller by the channel corrector module.

In one exemplary implementation, the corrector module and the channel controllers may be implemented as part of a field programmable gate array (FPGA) controller, where the FPGA controller may be a part of a data storage device.

The data storage device may include one or more memory boards, where each of the memory boards includes multiple memory devices. In one exemplary implementation, each of the memory boards may include multiple flash memory chips. The memory boards may include multiple channels, where one or more of the flash memory chips may be assigned to each of the channels. The data storage device may include a controller board to which the memory boards operably connect. The data storage device may be configured to communicate with a host using an interface to receive commands from the host and to process those commands using the flash memory chips. For example, the host may send and the controller board may receive commands to read, write, copy and erase blocks of data using the flash memory chips.

In one exemplary implementation, the controller includes a field-programmable gate array (FPGA) controller and the interface between the host and the controller board may be a high speed interface such as, for example, a peripheral component interconnect express (PCIe) interface. In this manner, the data storage device may include high storage volumes and may be configured to achieve high performance and high speeds of data transfer between the host and the flash memory chips.

In one exemplary implementation, the data storage device may be configured with two memory boards with each of the memory boards including multiple flash memory chips. The data storage device, including the controller board and two memory boards, may be configured in a disk drive form such that the data storage device fits in an on-board drive slot of a computing device. For instance, the data storage device may be configured to fit in an on-board drive slot of a server to provide data storage capacity for the server. The data storage device may be configured to be removable such that it may be removed easily from the computing device and inserted in the on-board drive slot of a different computing device.

In other exemplary implementations, each of the memory boards may include memory devices other than flash memory chips. For example, each of the memory boards may include multiple dynamic random access memory (DRAM) chips. In the same manner as described above with respect to the flash memory chips, the corrector module may be configured to operate as a shared resource to perform an error correction algorithm for the DRAM chips. In other exemplary implementations, the memory boards may include other types of memory devices including, for example, phase change memory (PCM) chips and other types of memory devices.

According to one general aspect, an apparatus for error correction for a data storage device may include an input interface that is configured to receive individual error correction requests to correct data from multiple channel controllers and that is configured to receive error correction information corresponding to the error correction requests, where each of the channel controllers is arranged and configured to control operations associated with one or more memory chips. The apparatus may include a corrector module that is operably coupled to the input interface and that is arranged and configured to perform error correction using an error correction algorithm and the error correction information to generate correction solutions, where the corrector module is a shared resource for the multiple channel controllers. The apparatus may include an output interface that is operably coupled to the corrector module and that is arranged and configured to communicate the correction solutions to the channel controllers.

Implementations may include one or more of the following features. For example, the input interface may include a buffer that is arranged and configured to store the error correction requests from the channel controllers and combiner logic circuitry that is arranged and configured to serialize the individual error correction requests into a single request stream for the corrector module. The combiner logic circuitry may be arranged and configured in a tree structure.

The input interface may be arranged and configured to arbitrate an order that the corrector module performs the error correction responsive to the individual error correction requests from the channel controllers. The input interface may be arranged and configured to arbitrate the order using a round robin scheme, a first-in first-out (FIFO) scheme and/or a fixed priority scheme.

In one exemplary implementation, the error correction algorithm includes a Bose Chauduri Hocquenghem (BCH) error correction algorithm. The output interface may include expander logic circuitry that is arranged and configured to broadcast the correction solutions to the channel controllers. The memory chips may include flash memory chips. The input interface, the corrector module, and the output interface may be a part of a field programmable gate array (FPGA) controller.

In another general aspect, a method for error correction for a data storage device may include receiving individual error correction requests to correct data from multiple channel controllers and receiving error correction information corresponding to the error correction requests, where each of the channel controllers may be arranged and configured to control operations associated with one or more memory chips, performing error correction using an error correction algorithm and the error correction information to generate correction solutions and communicating the correction solutions to the channel controllers.

Implementations may include one or more of the following features. For example, the method may include serializing the individual error correction requests into a single request stream. The method may include arbitrating an order for performing the error correction using a round robin scheme, a first-in first-out (FIFO) scheme and/or a fixed priority scheme.

In one exemplary implementation, performing error correction may include performing error correction using a Bose Chauduri Hocquenghem (BCH) error correction algorithm. Communicating the correction solutions may include broadcasting the correction solutions to the channel controllers.

In another general aspect, a system for error detection and correction in a data storage device may include multiple channel controllers, where each of the channel controllers is arranged and configured to control operations associated with one or more memory chips and each of the channel controllers includes an error encoder module that is arranged and configured to calculate error correction codes and an error detector module that is arranged and configured to detect errors in data read from the memory chips. The system may include a corrector module that is operably coupled to each of the channel controllers and that is arranged and configured to perform error correction using an error correction algorithm to generate correction solutions responsive to the errors detected by the error detection modules in the channel controllers, where the correction module is a shared resource for the multiple channel controllers.

Implementations may include one or more of the following features. For example, each of the multiple channel controllers may include a channel corrector module that is arranged and configured to receive the correction solution from the corrector module and to apply the correction solutions to the data. The memory chips may include flash memory chips.

The system may include an input interface that is operably coupled to the corrector module and to the channel controllers and that is arranged and configured to receive individual error correction requests to correct data from the multiple channel controllers and that is configured to receive error correction information corresponding to the error correction requests. The input interface may include a buffer that is arranged and configured to store the error correction request from the channel controllers and combiner logic circuitry that is arranged and configured to serialize the individual error correction requests into a single request stream for the corrector module and to arbitrate an order that the corrector module performs the error correction responsive to the individual error correction requests from the channel controllers.

The system may include an output interface that is operably coupled to the corrector module and to the channel controllers and that is arranged and configured to communicate the correction solutions to the channel controllers. The output interface may include expander logic circuitry that is arranged and configured to broadcast the correction solutions to the channel controllers. The channel controllers and the corrector module may be a part of a field programmable gate array (FPGA) controller.

In another general aspect, a data storage device may include multiple flash memory chips and a controller that is operably coupled to the flash memory chips and that is arranged and configured to receive commands from a host, where the controller comprises a corrector module that is arranged and configured to perform error correction using an error correction algorithm to generate correction solutions responsive to errors in data being written to or read from the flash memory chips, where the correction module is a shared resource for the flash memory chips.

Implementations may include one or more of the following features. For example, the controller may be a field programmable gate array (FPGA) controller. The data storage device may include multiple channel controllers, where each of the channel controllers is arranged and configured to control operations associated with one or more of the flash memory chips and each of the channel controllers may include an error encoder module that is arranged and configured to calculate error correction codes and an error detector module that is arranged and configured to detect the errors in data written to or read from the flash memory chips and to send error correction requests to the corrector module. Each of the channel controllers may include a channel corrector module that is arranged and configured to receive the correction solution from the corrector module and to apply the correction solutions to the data.

The data storage device may include a memory board on which the flash memory chips are arranged and configured into multiple channels, with each of the channels being associated with one or more of the flash memory chips and a controller board that is operably connected to the memory board, where the controller board may include a high speed interface and the controller that is arranged and configured to receive the commands from the host using the high speed interface.

In one exemplary implementation, the high speed interface may be a PCI-e interface and the controller may be a field programmable gate array (FPGA) controller. The data storage may include two memory boards on which the flash memory chips are arranged and configured into multiple channels, with each of the channels being associated with one or more of the flash memory chips and a controller board that is operably connected to the memory boards, where the controller board may include a high speed interface and the controller that is arranged and configured to receive the commands from the host using the high speed interface, where the memory boards are each separately removable from the controller board.

The details of one or more implementations are set forth in the accompanying drawings and the description below. Other features will be apparent from the description and drawings, and from the claims.

DETAILED DESCRIPTION

This document describes an apparatus, system(s) and techniques for error correction in a data storage device. A corrector module may be a shared resource for multiple memory chips, where the errors may be detected locally and then communicated to the corrector module for error correction using an error correction algorithm. The correction solution generated by the corrector module may be communicated back to the memory chips such that the correction solution may be applied locally. In this manner, the different stages of error correction, for example, error detection, error correction and error correction application may be performed in different locations using different resources. For instance, error detection and error correction application may be performed locally in channel controllers and error correction may be performed by a corrector module, where the corrector module is a shared resource. The shared corrector module may perform the calculation intensive aspects of error correction and then communicate the correction solutions to the channel controllers.

Figure 1:
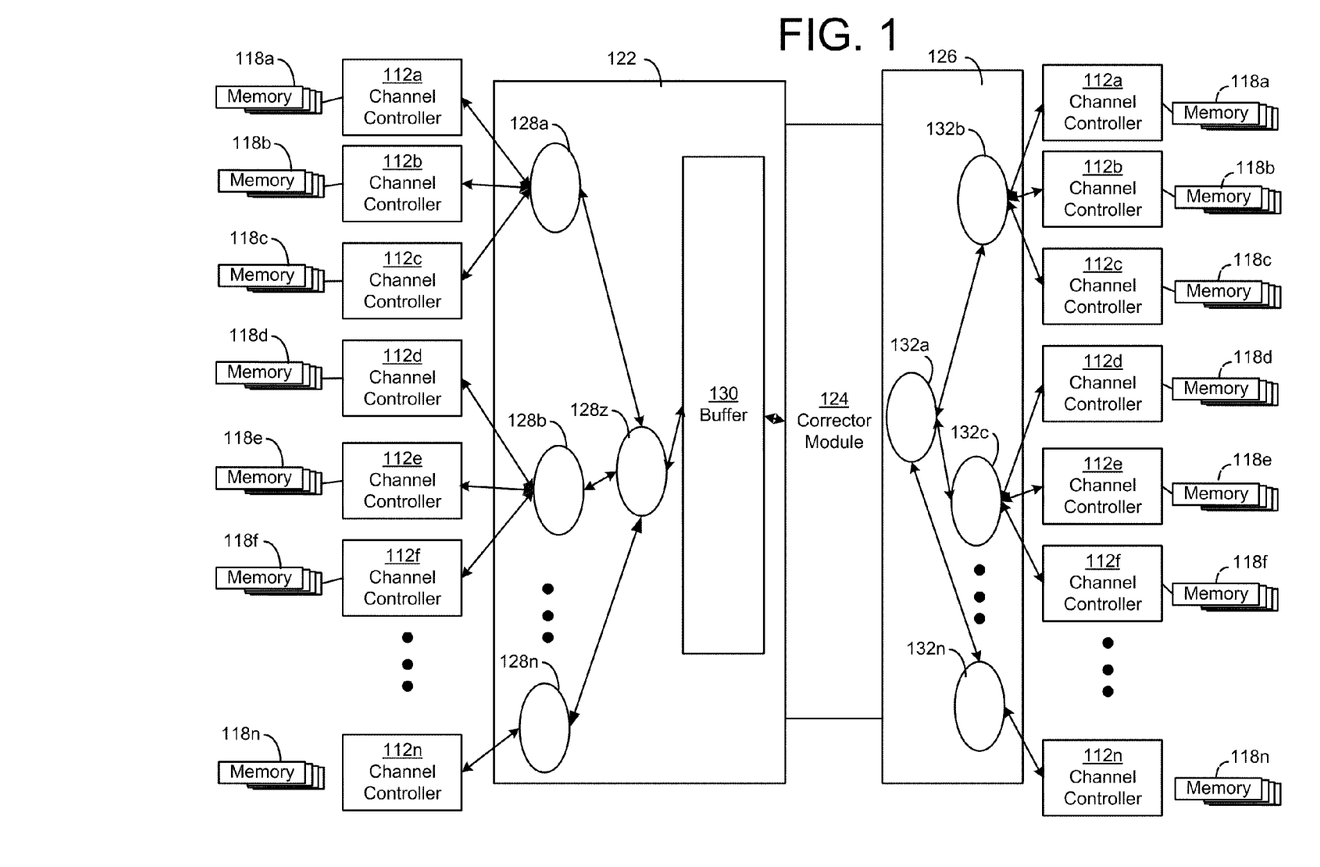
FIG. 1 is an exemplary block diagram of a corrector module for a data storage device.

Referring to FIG. 1, a block diagram of a system for error correction is illustrated. FIG. 1 illustrates multiple memory chips 118a-118n, multiple channel controllers 112a-112n, an input interface 122, a corrector module 124, and an output interface 126. Although the memory chips 118a-118n and the channel controllers 112a-112n are each illustrated twice in FIG. 1, they refer to the same components. The illustration of those components twice is meant for ease of illustration of the input interface 122 and the output interface 126.

The channel controllers 112a-112n are operably coupled to the memory chips 118a-118n and are configured to control operations and processing associated with the memory chips 118a-118n. For example, the channel controllers 112a-112n may be configured to control read data and write data operations on the memory chips 118a-118n, as well as other operations.

In one exemplary implementation, the memory chips 118a-118n may include flash memory chips. In another exemplary implementation, the memory chips 118a-118n may include DRAM chips or combinations of flash memory chips and DRAM chips. The memory chips 118a-118n may include other types of memory chips as well.

Figure 2A:
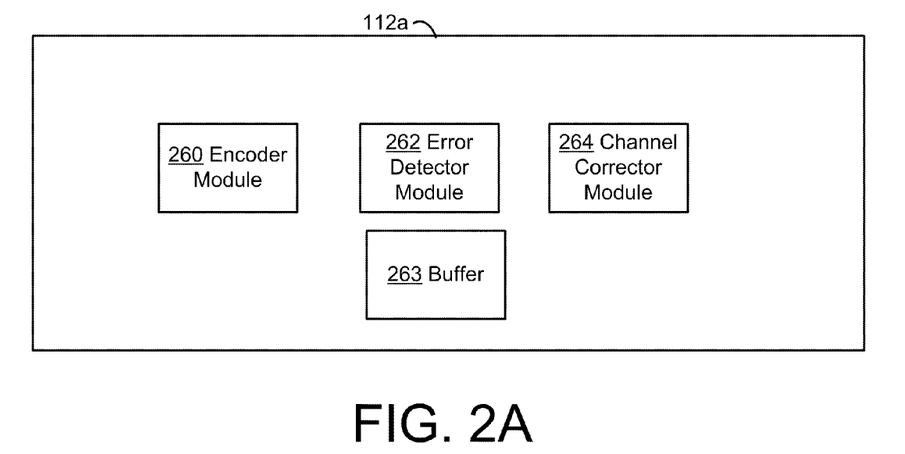
FIG. 2A is an exemplary block diagram of a channel controller.

Referring also to FIG. 2A, the channel controller 112a may include an encoder module 260, an error detector module 262, a buffer 263 and a channel corrector module 264. The channel controller 112a is representative of the multiple channel controllers 112a-112n. Each of the channel controllers 112a-112n may include an encoder module 260, an error detector module 262, a buffer 263 and a channel corrector module 264. The channel controller 112a and its components may provide processing for one or more memory chips.

The encoder module 260 may be configured to calculate error correction code (ECC) bits. For instance, when data is being written to the memory chips 118a, the encoder module 260 may calculate the ECC bits and may cause the ECC bits to be written along with the data to the designated memory chip. In this manner, the ECC bits are stored in the memory chips along with the data. The ECC bits may be and/or function like a checksum and may include one or more bits. For example, the ECC bits may include a multi-bit checksum.

The error detector module 262 may be configured to recalculate the ECC bits for particular data and compare the recalculated ECC bits with the ECC bits that are stored in the memory chip along with the data. For example, when the data is to be read from the memory chip controlled by channel controller 112a, the error detector module 262 may recalculate the ECC bits for the data and compare the recalculated ECC bits to the original ECC bits calculated by the encoder module 260. If the comparison of the ECC bits is a match, then the data is communicated to the host or application that requested the data. If the comparison of the ECC bits does not result in a match or otherwise indicates an error in the data, then error correction may be performed on the data. If error correction is needed, the data may be temporarily stored in the buffer 263 until a correction solution can be calculated. Then, the correction solution may be applied by the channel corrector module 264 while the data is stored in the buffer 263.

Referring back to FIG. 1, the channel controller 112a may generate an error correction request to indicate that error correction is needed by the corrector module 124. The channel controller 112a may assert the error correction request and it may be communicated to the input interface 122. An apparatus for error correction for a data storage device may include the input interface 122, the corrector module 124 and the output interface 126. These components may be shared by all of the memory chips 118a-118n and their respective channel controllers 112a-112n.

The input interface 122 may be operably coupled to each of the channel controllers 112a-112n. The input interface 122 may be configured to receive the individual error correction requests from each of the channel controllers 112a-112n. The input interface 122 may include one or more combiners 128a-128z. The combiners 128a-128z may be configured to serialize the individual error correction requests. The combiners 128a-128z may include logic circuitry to serialize the error correction requests such that the request are organized in a serial manner for the corrector module 124.

Each of the combiners 128a-128z may interface with multiple channel controllers 112a-112n and/or may interface with multiple other combiners. For example, the combiner 128a may interface with channel controllers 112a-112c to receive and serialize the error correction requests from channel controllers 112a-112c. The combiner 128a may forward the requests to combiner 128z for combination and serialization of the requests received by the other combiners 128b-128n. In this manner, in one exemplary implementation, the combiners 128a-128z may be organized into a tree structure, where the channel controllers 112a-112n may be the leaves and the combiners 128a-128n may be the branches leading up to a single combiner 128z such that a single request is provided to the corrector module 124. The tree structure may include multiple levels of combiners. In other exemplary implementations, other types of structures and organization may be used.

The input interface 122 also may be configured to arbitrate an order in which the corrector module 124 performs the error correction in response to the individual error correction requests communicated by the channel controllers 112a-112n. The input interface 122 may determine which error correction request takes priority over other error correction requests.

The input interface 122 may be configured to use different schemes to arbitrate the order of priority acting on the error correction requests. In one exemplary implementation, a first-in first-out (FIFO) scheme may be used to determine the order of the priority. In this manner, the error correction requests may be processed in the order that they were asserted by the channel controller or they may be processed in the order that they were received by the combiners 128a-128z.

In another exemplary implementation, a round robin scheme may be used to determine the order of the priority. For example, the input interface 122 may query each of the channel controllers 112a-112n in a cyclic manner to determine if there are any error correction requests for processing. The input interface 122 may communicate the query to the channel controller through the combiner circuitry logic. In this manner, each of the channel controllers 112a-112n is queried on a periodic basis to determine if there are any error correction requests for processing.

In another exemplary implementation, the input interface 122 may use a fixed priority scheme to determine the priority of requests. In this scheme, the input interface 122 may guarantee that each of the channel controllers 112a-112n could get a turn before the next possible correction could be generated by another channel controller.

The input interface 122 may include a buffer 130 to store the error correction requests received from the channel controllers 112a-112n. The requests may be stored in the buffer 130 in the order that they are to be processed by the corrector module 124. The buffer 130 may be sized such that the buffer 130 may be large enough to handle any and all of the outstanding error correction requests that may be generated by the channel controllers 112a-112n.

In one exemplary implementation, the input interface may send a signal to the channel controller when an error correction request generated by that channel controller is ready for processing. The channel controller may communicate error correction information to the input interface 122 using the combiners 128a-128z. The error correction information may include the error correction codes and other bits that may be needed by the corrector module 124 to generate a correction solution. The error correction information also may be referred to as error syndromes, which includes the information needed by the corrector module 124 using an error correction algorithm to generate the correction solution. The error correction information may vary and depend on the particular type of error correction algorithm being used by the corrector module 124.

In one exemplary implementation, the error correction information may be communicated along with the error correction request. In this manner, the channel controller may communicate the error correction information including the error correction codes and other bits that may be needed by the corrector module 124 to generate the correction solution at the same time that the request for error correction is sent to the input interface 122 using the combiners 128a-128z.

The corrector module 124 may be operably coupled to the input interface 122 and the output interface 126. The corrector module 124 may be configured to perform error correction using an error correction algorithm and the error correction information received from the channel controllers 112a-112n. The corrector module 124 may generate correction solutions to correct the corrupted data or to correct at least a portion of the corrupted data. The corrector module 124 may be configured to correct up to a variable number of corrupt bits. In one exemplary implementation, the number of correctible bits may depend on the type of memory chips 118a-118n being used for data storage.

Figure 2B:
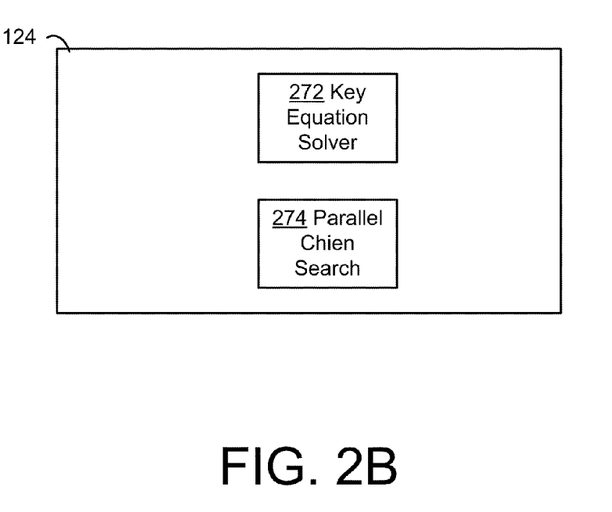
FIG. 2B is an exemplary block diagram of a corrector module.

Referring also to FIG. 2B, an exemplary block diagram of a corrector module 124 is illustrated. The corrector module 124 may interface with input/output logic, which may include an input interface (e.g., input interface 122 of FIG. 1) and an output interface (e.g., output interface 126 of FIG. 1). In this example, the corrector module 124 may include a Bose Chauduri Hocquenghem (BCH) corrector module that may be configured to use a BCH error correction algorithm to generator correction solutions responsive to error correction requests from the channel controllers. The BCH corrector module may include a key equation solver 272 and a parallel chien search module 274. These two modules may use the error correction information including the syndromes to perform calculations to determine the correction solutions. The correction solutions may be applied back at the channel controller to correct the corrupted bits.

Referring back to FIG. 1, the correction module 124 may communicate the correction solutions to the output interface 126. The output interface 126 may be configured to communicate the correction solutions to the channel controllers 112a-112n. The output interface 126 may include one or more expanders 132a-132n. The expanders 132a-132n may be configured to de-serialize the correction solutions and to broadcast the corrections solutions to the channel controllers 112a-112n. The expanders 132a-132n may include circuitry logic to de-serialize the correction solutions.

As discussed above with respect to FIG. 2A, the channel controllers may receive the correction solutions and use the channel corrector module 264 to apply the correction solutions to the data. In this manner, the data is essentially corrected in place at the channel controller such that the data does not need to be communicated to other components for correction.

In one exemplary implementation, the channel controllers 112a-112n, the input interface 122, the corrector module 124 and the output interface 126 may be implemented as a part of a field programmable gate array (FPGA) controller. The FPGA controller may be configured using firmware or other instructions to program the FPGA controller to perform the functions discussed herein.

Figure 3:
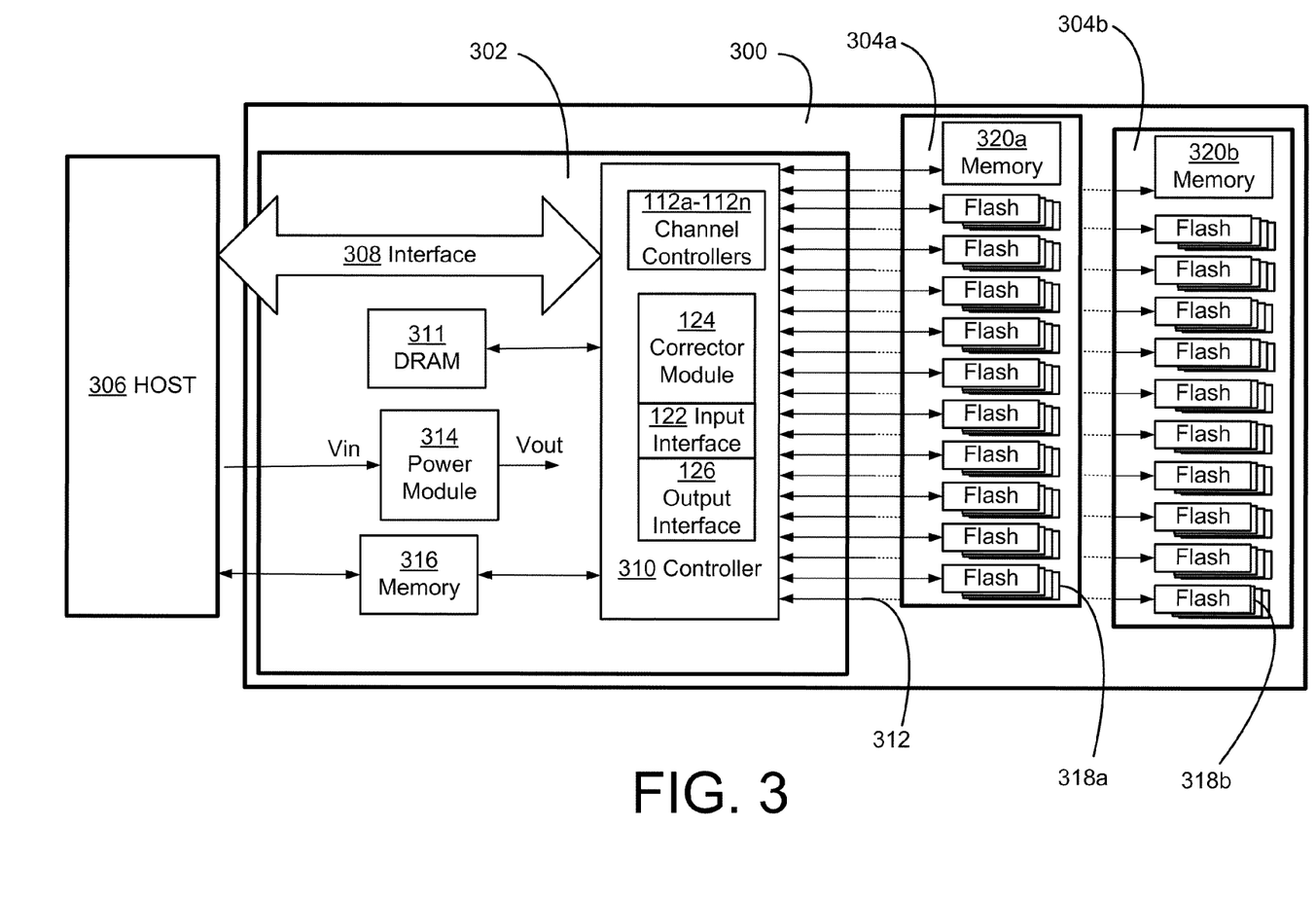
FIG. 3 is an exemplary block diagram of a data storage device.

FIG. 3 is a block diagram of a data storage device 300. The data storage device 300 may include a controller board 302 and one or more memory boards 304a and 304b. The data storage device 300 may communicate with a host 306 over an interface 308. The interface 308 may be between the host 306 and the controller board 302. The controller board 302 may include a controller 310, a DRAM 311, multiple channels 312, a power module 314, and a memory module 316. The controller 310 may include the channel controllers 112a-112n, the input interface 122, the corrector module 124 and the output interface 126, as described in FIG. 1 and FIGS. 2A and 2B. The memory boards 304a and 304b may include multiple flash memory chips 318a and 318b on each of the memory boards. The memory boards 304a and 304b also may include a memory device 320a and 320b.

In general, the data storage device 300 may be configured to store data on the flash memory chips 318a and 318b. The host 306 may write data to and read data from the flash memory chips 318a and 318b, as well as cause other operations to be performed with respect to the flash memory chips 318a and 318b. The reading and writing of data between the host 106 and the flash memory chips 318a and 318b, as well as the other operations, may be processed through and controlled by the controller 310 on the controller board 302. The controller 310 may receive commands from the host 306 and cause those commands to be executed using the flash memory chips 318a and 318b on the memory boards 304a and 304b. The communication between the host 306 and the controller 310 may be through the interface 308. The controller 310 may communicate with the flash memory chips 318a and 318b using the channels 312.

As discussed above with respect to FIG. 1, the channel controllers 112a-112n may be configured to control the operations on the flash memory chips. The channel controllers 112a-112n may be configured to encode the data being written to the flash memory chips with ECC codes that are stored in the flash memory chips along with the data. The channel controllers 112a-112n also may be configured to detect errors when the host sends a command to read the data from the flash memory chips. The channel controllers 112a-112n may recalculate the ECC codes and compare the recalculated codes to the codes stored in the flash memory chip. If an error is detected, the channel controllers 112a-112n may use a shared resource, the corrector module 124 to perform the error correction calculations and to generate the correction solutions. The correction solutions are then communicated back to the channel controllers 112a-112n such that the data are corrected in place.

The controller board 302 may include DRAM 311. The DRAM 311 may be operably coupled to the controller 310 and may be used to store information. For example, the DRAM 311 may be used to store logical address to physical address maps and bad block information. The DRAM 311 also may be configured to function as a buffer between the host 306 and the flash memory chips 318a and 318b.

In one exemplary implementation, the controller board 302 and each of the memory boards 304a and 304b are physically separate printed circuit boards (PCBs). The memory board 304a may be on one PCB that is operably connected to the controller board 302 PCB. For example, the memory board 304a may be physically and/or electrically connected to the controller board 302. Similarly, the memory board 304b may be a separate PCB from the memory board 304a and may be operably connected to the controller board 302 PCB. For example, the memory board 304b may be physically and/or electrically connected to the controller board 302. The memory boards 304a and 304b each may be separately disconnected and removable from the controller board 302. For example, the memory board 304a may be disconnected from the controller board 302 and replaced with another memory board (not shown), where the other memory board is operably connected to controller board 302. In this example, either or both of the memory boards 304a and 304b may be swapped out with other memory boards such that the other memory boards may operate with the same controller board 302 and controller 310.

In one exemplary implementation, the controller board 302 and each of the memory boards 304a and 304b may be physically connected in a disk drive form factor. The disk drive form factor may include different sizes such as, for example, a 3.5" disk drive form factor and a 2.5" disk drive form factor.

In one exemplary implementation, the controller board 302 and each of the memory boards 304a and 304b may be electrically connected using a high density ball grid array (BGA) connector. Other variants of BGA connectors may be used including, for example, a fine ball grid array (FBGA) connector, an ultra fine ball grid array (UBGA) connector and a micro ball grid array (MBGA) connector. Other types of electrical connection means also may be used.

Figure 4:
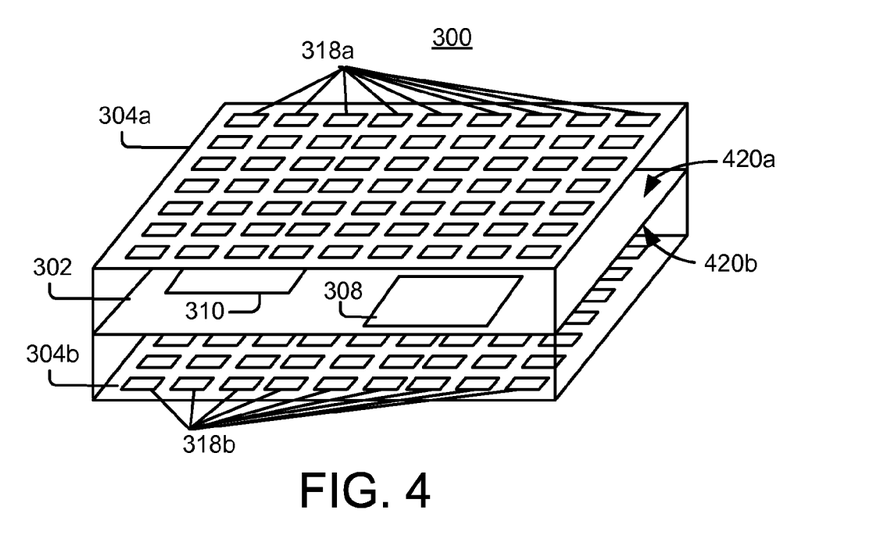
FIG. 4 is an exemplary perspective block diagram of the printed circuit boards of the data storage device.

In one exemplary implementation, the controller board 302, which is its own PCB, may be located physically between each of the memory boards 304a and 304b, which are on their own separate PCBs. Referring also to FIG. 4, the data storage device 300 may include the memory board 304a on one PCB, the controller board 302 on a second PCB, and the memory board 304b on a third PCB. The memory board 304a includes multiple flash memory chips 318a and the memory board 304b includes multiple flash memory chips 318b. The controller board 302 includes the controller 310 and the interface 308 to the host (not shown), as well as other components (not shown).

In the example illustrated by FIG. 4, the memory board 304a may be operably connected to the controller board 302 and located on one side 420a of the controller board 302. For instance, the memory board 304a may be connected to a top side 420a of the controller board 302. The memory board 304b may be operably connected to the controller board 302 and located on a second side 420b of the controller board 302. For instance, the memory board 304b may be connected to a bottom side 420b of the controller board 302.

Other physical and/or electrical connection arrangements between the memory boards 304a and 304b and the controller board 302 are possible. FIG. 4 merely illustrates one exemplary arrangement. For example, the data storage device 300 may include more than two memory board such as three memory boards, four memory boards or more memory boards, where all of the memory boards are connected to a single controller board. In this manner, the data storage device may still be configured in a disk drive form factor. Also, the memory boards may be connected to the controller board in other arrangements such as, for instance, the controller board on the top and the memory cards on the bottom or the controller board on the bottom and the memory cards on the top.

Figure 5:
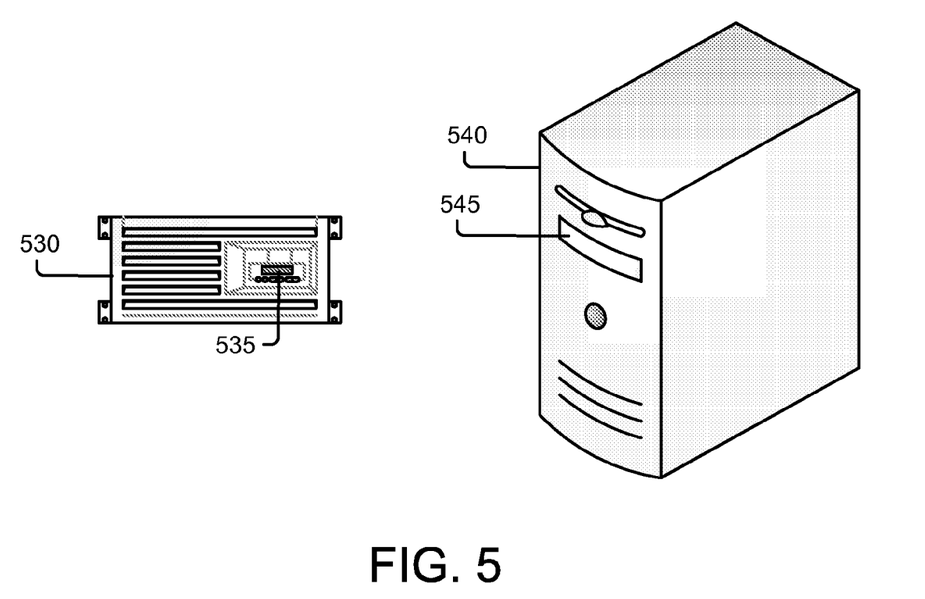
FIG. 5 is an exemplary block diagram of exemplary computing devices for use with the data storage device of FIG. 3.

The data storage device 300 may be arranged and configured to cooperate with a computing device. In one exemplary implementation, the controller board 302 and the memory boards 304a and 304b may be arranged and configured to fit within a drive bay of a computing device. Referring to FIG. 5, two exemplary computing devices are illustrated, namely a server 530 and a server 540. The servers 530 and 540 may be arranged and configured to provide various different types of computing services. The servers 530 and 540 may include a host (e.g., host 306 of FIG. 3) that includes computer program products having instructions that cause one or more processors in the servers 530 and 540 to provide computing services. The type of server may be dependent on one or more application programs that are operating on the server. For instance, the servers 530 and 540 may be application servers, web servers, email servers, search servers, streaming media servers, e-commerce servers, file transfer protocol (FTP) servers, other types of servers or combinations of these servers. The server 530 may be configured to be a rack-mounted server that operates within a server rack. The server 540 may be configured to be a stand-alone server that operates independent of a server rack. Even though the server 540 is not within a server rack, it may be configured to operate with other servers and may be operably connected to other servers. Servers 530 and 540 are meant to illustrate example computing devices and other computing devices, including other types of servers, may be used.

In one exemplary implementation, the data storage device 300 of FIGS. 3 and 4 may be sized to fit within a drive bay 535 of the server 530 of the drive bay 545 of the server 540 to provide data storage functionality for the servers 530 and 540. For instance, the data storage device 300 may be sized to a 3.5" disk drive form factor to fit in the drive bays 535 and 545. The data storage device 300 also may be configured to other sizes. The data storage device 300 may operably connect and communicate with the servers 530 and 540 using the interface 308. In this manner, the host may communicate commands to the controller board 302 using the interface 308 and the controller 310 may execute the commands using the flash memory chips 318a and 318b on the memory boards 304a and 304b.

Referring back to FIG. 3, the interface 308 may include a high speed interface between the controller 310 and the host 306. The high speed interface may enable for fast transfers of data between the host 306 and the flash memory chips 318a and 318b. In one exemplary implementation, the high speed interface may include a PCIe interface. For instance, the PCIe interface may be a PCIe x4 interface or a PCIe x8 interface. The PCIe interface 308 may include a connector to the host 306 such as, for example, a PCIe connector cable assembly. Other high speed interfaces, connectors and connector assemblies also may be used.

In one exemplary implementation, the communication between the controller board 302 and the flash memory chips 318a and 318b on the memory boards 304a and 304b may be arranged and configured into multiple channels 312. Each of the channels 312 may communicate with one or more flash memory chips 318a and 318b and may be controlled by the channel controllers 112a-112n. The controller 310 may be configured such that commands received from the host 306 may be executed by the controller 310 using each of the channels 312 simultaneously or at least substantially simultaneously. In this manner, multiple commands may be executed simultaneously on different channels 312, which may improve throughput of the data storage device 300.

In the example of FIG. 3, twenty (20) channels 312 are illustrated. The completely solid lines illustrate the ten (10) channels between the controller 310 and the flash memory chips 318a on the memory board 304a. The mixed solid and dashed lines illustrate the ten (10) channels between the controller 310 and the flash memory chips 318b on the memory board 304b. As illustrated in FIG. 3, each of the channels 312 may support multiple flash memory chips. For instance, each of the channels 312 may support up to 32 flash memory chips. In one exemplary implementation, each of the 20 channels may be configured to support and communicate with 6 flash memory chips. In this example, each of the memory boards 304a and 304b would include 60 flash memory chips each. Depending on the type and the number of the flash memory chips 318a and 318b, the data storage 100 device may be configured to store up to and including multiple terabytes of data.

The controller 310 may include a microcontroller, a FPGA controller, other types of controllers, or combinations of these controllers. In one exemplary implementation, the controller 310 is a microcontroller. The microcontroller may be implemented in hardware, software, or a combination of hardware and software. For example, the microcontroller may be loaded with a computer program product from memory (e.g., memory module 316) including instructions that, when executed, may cause the microcontroller to perform in a certain manner. The microcontroller may be configured to receive commands from the host 306 using the interface 308 and to execute the commands. For instance, the commands may include commands to read, write, copy and erase blocks of data using the flash memory chips 318a and 318b, as well as other commands.

In another exemplary implementation, the controller 310 is a FPGA controller. The FPGA controller may be implemented in hardware, software, or a combination of hardware and software. For example, the FPGA controller may be loaded with firmware from memory (e.g., memory module 316) including instructions that, when executed, may cause the FPGA controller to perform in a certain manner. The FPGA controller may be configured to receive commands from the host 306 using the interface 308 and to execute the commands. For instance, the commands may include commands to read, write, copy and erase blocks of data using the flash memory chips 318a and 318b, as well as other commands.

In one exemplary implementation, the FPGA controller may support multiple interfaces 308 with the host 306. For instance, the FPGA controller may be configured to support multiple PCIe x4 or PCIe x8 interfaces with the host 306.

The memory module 316 may be configured to store data, which may be loaded to the controller 310. For instance, the memory module 316 may be configured to store one or more images for the FPGA controller, where the images include firmware for use by the FPGA controller. The memory module 316 may interface with the host 306 to communicate with the host 306. The memory module 316 may interface directly with the host 306 and/or may interface indirectly with the host 306 through the controller 310. For example, the host 306 may communicate one or more images of firmware to the memory module 316 for storage. In one exemplary implementation, the memory module 316 includes an electrically erasable programmable read-only memory (EEPROM). The memory module 316 also may include other types of memory modules.

The power module 314 may be configured to receive power (Vin), to perform any conversions of the received power and to output an output power (Vout). The power module 314 may receive power (Vin) from the host 306 or from another source. The power module 314 may provide power (Vout) to the controller board 302 and the components on the controller board 302, including the controller 310. The power module 314 also may provide power (Vout) to the memory boards 304a and 304b and the components on the memory boards 304a and 304b, including the flash memory chips 318a and 318b.

In one exemplary implementation, the power module 314 may include one or more direct current (DC) to DC converters. The DC to DC converters may be configured to receive a power in (Vin) and to convert the power to one or more different voltage levels (Vout). For example, the power module 314 may be configured to receive +12 V (Vin) and to convert the power to 3.3 v, 1.2 v, or 1.8 v and to supply the power out (Vout) to the controller board 302 and to the memory boards 304a and 304b.

The memory boards 304a and 304b may be configured to handle different types of flash memory chips 318a and 318b. In one exemplary implementation, the flash memory chips 318a and the flash memory chips 318b may be the same type of flash memory chips including requiring the same voltage from the power module 314 and being from the same flash memory chip vendor. The terms vendor and manufacturer are used interchangeably throughout this document.

In another exemplary implementation, the flash memory chips 318a on the memory board 304a may be a different type of flash memory chip from the flash memory chips 318b on the memory board 304b. For example, the memory board 304a may include SLC NAND flash memory chips and the memory board 304b may include MLC NAND flash memory chips. In another example, the memory board 304a may include flash memory chips from one flash memory chip manufacturer and the memory board 304b may include flash memory chips from a different flash memory chip manufacturer. The flexibility to have all the same type of flash memory chips or to have different types of flash memory chips enables the data storage device 300 to be tailored to different applications being used by the host 306.

In another exemplary implementation, the memory boards 304a and 304b may include different types of flash memory chips on the same memory board. For example, the memory board 304a may include both SLC NAND chips and MLC NAND chips on the same PCB. Similarly, the memory board 304b may include both SLC NAND chips and MLC NAND chips. In this manner, the data storage device 300 may be advantageously tailored to meet the specifications of the host 306.

In another exemplary implementation, the memory boards 304a and 304b may include other types of memory devices, including non-flash memory chips. For instance, the memory boards 304a and 304b may include random access memory (RAM) such as, for instance, dynamic RAM (DRAM) and static RAM (SRAM) as well as other types of RAM and other types of memory devices. In one exemplary implementation, the both of the memory boards 304a and 304 may include RAM. In another exemplary implementation, one of the memory boards may include RAM and the other memory board may include flash memory chips. Also, one of the memory boards may include both RAM and flash memory chips.

The memory modules 320a and 320b on the memory boards 304a and 304b may be used to store information related to the flash memory chips 318a and 318b, respectively. In one exemplary implementation, the memory modules 320a and 320b may store device characteristics of the flash memory chips. The device characteristics may include whether the chips are SLC chips or MLC chips, whether the chips are NAND or NOR chips, a number of chip selects, a number of blocks, a number of pages per block, a number of bytes per page and a speed of the chips.

In one exemplary implementation, the memory modules 320a and 320b may include serial EEPROMs. The EEPROMs may store the device characteristics. The device characteristics may be compiled once for any given type of flash memory chip and the appropriate EEPROM image may be generated with the device characteristics. When the memory boards 304a and 304b are operably connected to the controller board 302, then the device characteristics may be read from the EEPROMs such that the controller 310 may automatically recognize the types of flash memory chips 318a and 318b that the controller 310 is controlling. Additionally, the device characteristics may be used to configure the controller 310 to the appropriate parameters for the specific type or types of flash memory chips 318a and 318b.

Figure 6:
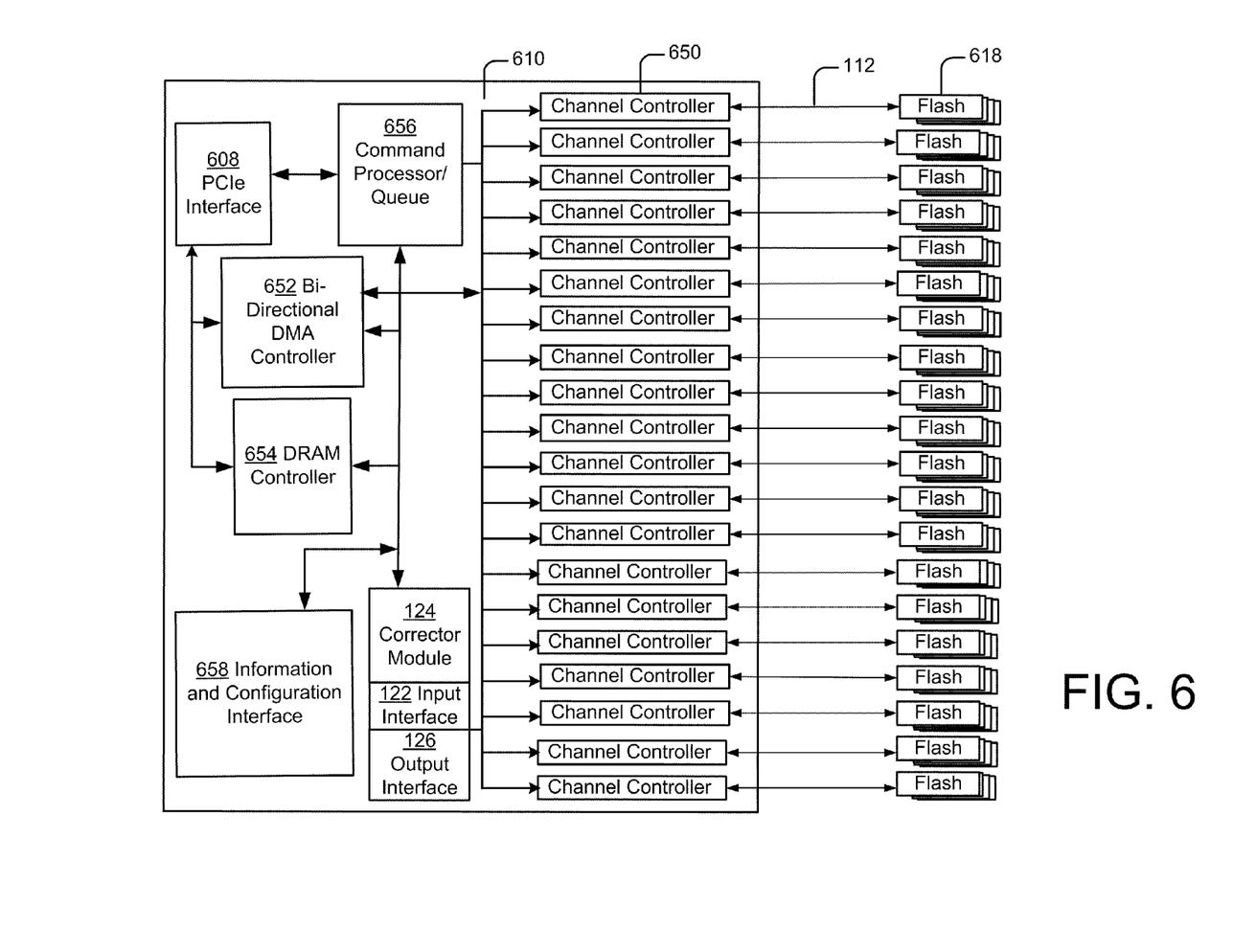
FIG. 6 is an exemplary block diagram of a controller.

As discussed above, the controller 310 may include a FPGA controller. Referring to FIG. 6, an exemplary block diagram of a FPGA controller 610 is illustrated. The FPGA controller may be configured to operate in the manner described above with respect to controller 310 of FIG. 3. The FPGA controller 610 may include multiple channel controllers 650 to connect the multiple channels 112 to the flash memory chips 618. The flash memory chips 618 are illustrated as multiple flash memory chips that connect to each of the channel controllers 650. The flash memory chips 618 are representative of the flash memory chips 318a and 318b of FIG. 3, which are on the separate memory boards 304a and 304b of FIG. 3. The separate memory boards are not shown in the example of FIG. 6. The FPGA controller 610 may include a PCIe interface module 608, a bi-directional direct memory access (DMA) controller 652, a dynamic random access memory (DRAM) controller 654, a command processor 656 and an information and configuration interface module 458. The FPGA controller 610 also may include the input interface 122, the corrector module 124 and the output interface 126.

Information may be communicated with a host (e.g., host 306 of FIG. 3) using an interface. In this example, FIG. 6, the FPGA controller 610 includes a PCIe interface to communicate with the host and a PCIe interface module 608. The PCIe interface module 608 may be arranged and configured to receive commands from the host and to send commands to the host. The PCIe interface module 608 may provide data flow control between the host and the data storage device. The PCIe interface module 608 may enable high speed transfers of data between the host and the controller 610 and ultimately the flash memory chips 618. In one exemplary implementation, the PCIe interface and the PCIe interface module 608 may include a 64-bit bus.

The bi-directional DMA controller 652 may be configured to interface with the PCIe interface 608, the command processor 656 and each of the channel controllers 650. The bi-directional DMA controller 652 enables bi-directional direct memory access between the host and the flash memory chips 618.

The DRAM controller 654 may be arranged and configured to control the translation of logical to physical addresses. For example, the DRAM controller 654 may assist the command processor 656 with the translation of the logical addresses used by the host and the actual physical addresses in the flash memory chips 618 related to data being written to or read from the flash memory chips 618. A logical address received from the host may be translated to a physical address for a location in one of the flash memory chips 618. Similarly, a physical address for a location in one of the flash memory chips 618 may be translated to a logical address and communicated to the host.

The command processor 656 may be arranged and configured to retrieve the commands from the host through the PCIe interface module 608 and to control the execution of the commands through the channel controllers 650. The command processor 656 may maintain a queue for a number of commands to be executed and order the commands using an ordered list to ensure that the oldest commands may be processed first. The command processor 656 may maintain the order of the commands designated for the same flash memory chip and may reorder the commands designated for different flash memory chips. In this manner, multiple commands may be executed simultaneously and each of the channels 112 may be used simultaneously or at least substantially simultaneously.

The command processor 656 may be configured to process commands for different channels 112 out of order and preserve per-channel command ordering. For instance, commands that are received from the host and that are designated for different channels may be processed out of order by the command processor 656. In this manner, the channels may be kept busy. Commands that are received from the host for processing on the same channel may be processed in the order that the commands were received from the host by the command processor 656. In one exemplary implementation, the command processor 656 may be configured to maintain a list of commands received from the host in an oldest-first sorted list to ensure timely execution of the commands.

The channel controllers 650 may be arranged and configured to process commands from the command processor 656. Each of the channel controllers 650 may be configured to process commands for multiple flash memory chips 618. In one exemplary implementation, each of the channel controllers 650 may be configured to process commands for up to and including 32 flash memory chips 618.

The channel controllers 650 may be configured to process the commands from the command processor 656 in order as designated by the command processor 656. Examples of the commands that may be processed include, but are not limited to, reading a flash page, programming a flash page, copying a flash page, erasing a flash block, reading a flash block's metadata, mapping a flash memory chip's bad blocks, and resetting a flash memory chip.

The information and configuration interface module 658 may be arranged and configured to interface with a memory module (e.g., memory module 316 of FIG. 3) to receive configuration information for the FPGA controller 610. For example, the information and configuration interface module 658 may receive one or more images from the memory module to provide firmware to the FPGA controller 610. Modifications to the images and to the firmware may be provided by the host to the controller 610 through the information and configuration interface module 658. Modifications received through the information and configuration interface module 658 may be applied to any of the components of the controller 610 including, for example, the PCIe interface module 608, the bus master 116, the address translation controller 654, the command processor 656 and the channel controllers 650. The information and configuration interface module 658 may include one or more registers, which may be modified as necessary by instructions from the host.

The FPGA controller 610 may be arranged and configured to cooperate and process commands in conjunction with the host. The FPGA controller 610 may perform or at least assist in performing error correction, bad block management, logical to physical mapping, garbage collection, wear levelling, partitioning and low level formatting related to the flash memory chips 618. The FGPA controller 610 may perform error correction using the input interface 122, the corrector module 124 and the output interface 126, as discussed above.

Figure 7:
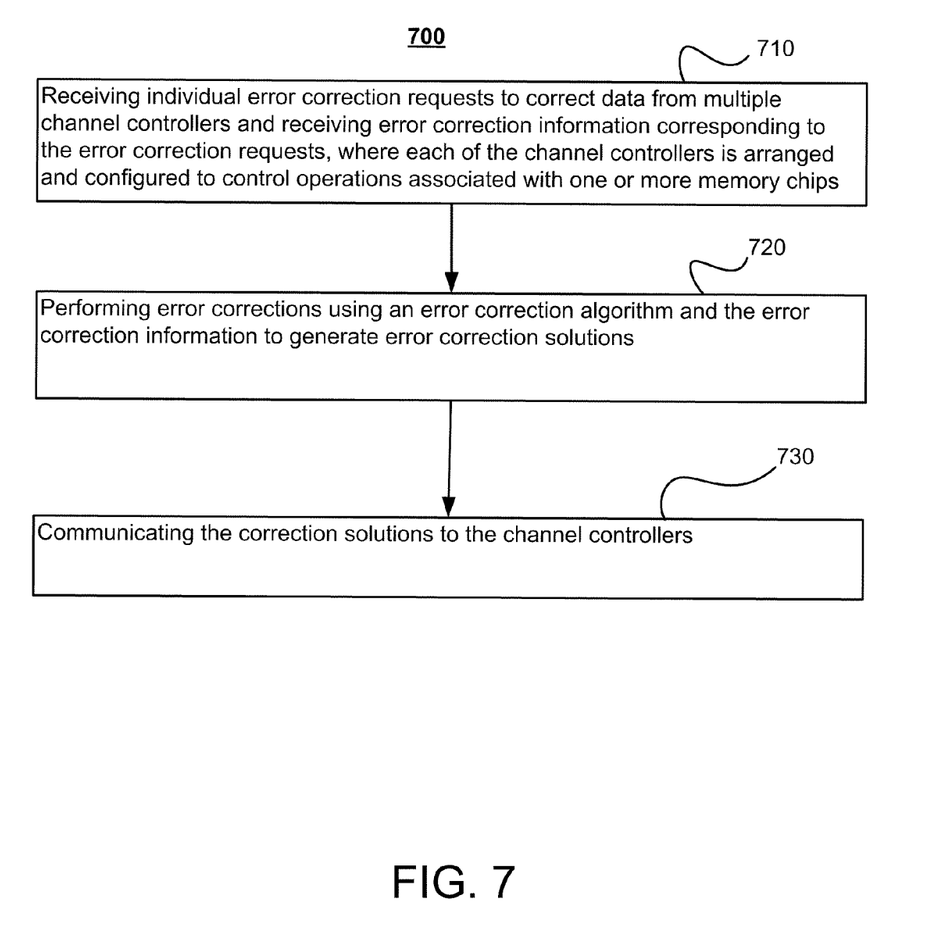
FIG. 7 is an exemplary flowchart illustrating a process for correcting errors in a data storage device.

Referring to FIG. 7, a process 700 is illustrated for correcting errors in a data storage device. Process 700 may include receiving individual error correction requests to correct data from multiple channel controllers and receiving error correction information corresponding to the error correction requests, where each of the channel controllers may be configured to control operations associated with one or more memory chips (710). Process 700 also may include performing error correction using an error correction algorithm and the error correction information to generate correction solutions (720) and communicating the correction solutions to the channel controllers (730). The process 700 may be performed by an input interface, a corrector module and an output interface such as, for example, the input interface 122, the corrector module 124 and the output interface 126 of FIGS. 1 and 2.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus for error correction for a data storage device, comprising:
  an input interface that is arranged and configured to receive individual error correction requests to correct data from multiple channel controllers and that is configured to receive error correction information corresponding to the error correction requests, wherein each of the channel controllers is arranged and configured to control operations associated with one or more memory chips, wherein the input interface comprises:
    a buffer that is arranged and configured to store the error correction requests from the channel controllers, and
    combiner logic circuitry that is arranged in a tree structure and that is configured to serialize the individual error correction requests into a single request stream;
  a corrector module that is operably coupled to the input interface and that is arranged and configured to perform error correction on the single request stream using an error correction algorithm and the error correction information to generate correction solutions, wherein the corrector module is a shared resource for the multiple channel controllers; and
  an output interface that is operably coupled to the corrector module and that is arranged and configured to communicate the correction solutions to the channel controllers, wherein the output interface comprises expander logic circuitry that is configured to de-serialize the correction solutions and to broadcast the correction solutions to the channel controllers.

2. The apparatus of claim 1 wherein the input interface is arranged and configured to arbitrate an order that the corrector module performs the error correction responsive to the individual error correction requests from the channel controllers.

3. The apparatus of claim 2 wherein the input interface is arranged and configured to arbitrate the order using a round robin scheme.

4. The apparatus of claim 2 wherein the input interface is arranged and configured to arbitrate the order using a first-in first-out (FIFO) scheme.

5. The apparatus of claim 2 wherein the input interface is arranged and configured to arbitrate the order using a fixed priority scheme.

6. The apparatus of claim 1 wherein the error correction algorithm includes a Bose Chauduri Hocquenghem (BCH) error correction algorithm.

7. The apparatus of claim 1 wherein the output interface comprises expander logic circuitry that is arranged and configured to broadcast the correction solutions to the channel controllers.

8. The apparatus of claim 1 wherein the memory chips comprise flash memory chips.

9. The apparatus of claim 1 wherein the input interface, the corrector module, and the output interface are a part of a field programmable gate array (FPGA) controller.

10. A method for error correction for a data storage device, the method comprising:
  receiving individual error correction requests to correct data from multiple channel controllers and receiving error correction information corresponding to the error correction requests, wherein each of the channel controllers is arranged and configured to control operations associated with one or more memory chips;
  storing the error correction requests from the channel controllers in a buffer;
  serializing the individual error correction requests into a single request stream;
  performing error correction on the single request stream using an error correction algorithm and the error correction information to generate correction solutions;
  de-serializing the correction solutions; and
  communicating the correction solutions to the channel controllers.

11. The method as in claim 10 further comprising arbitrating an order for performing the error correction using a round robin scheme.

12. The method as in claim 10 further comprising arbitrating an order for performing the error correction using a first-in first-out (FIFO) scheme.

13. The method as in claim 10 further comprising arbitrating an order for performing the error correction using a fixed priority scheme.

14. The method as in claim 10 wherein performing error correction comprises performing error correction using a Bose Chauduri Hocquenghem (BCH) error correction algorithm.

15. The method as in claim 10 wherein communicating the correction solutions comprises broadcasting the correction solutions to the channel controllers.

16. A system for error detection and correction in a data storage device, comprising:
  multiple channel controllers, wherein each of the channel controllers is arranged and configured to control operations associated with one or more memory chips and each of the channel controllers comprises an error encoder module that is arranged and configured to calculate error correction codes and an error detector module that is arranged and configured to detect errors in data read from the memory chips;
  combiner logic circuitry that is operably coupled to the channel controllers and that is arranged in a tree structure and that is configured to serialize the individual error correction requests into a single request stream;
  a corrector module that is operably coupled to the combiner logic circuitry and that is arranged and configured to perform error correction on the single request stream using an error correction algorithm to generate correction solutions responsive to the errors detected by the error detection modules in the channel controllers, wherein the correction module is a shared resource for the multiple channel controllers; and
  expander logic circuitry that is operably coupled to the corrector module and that is arranged and configured to de-serialize the correction solutions and to broadcast the correction solutions to the channel controllers.

17. The system of claim 16 wherein each of the multiple channel controllers further comprises a channel corrector module that is arranged and configured to receive the correction solution from the expander logic circuitry and to apply the correction solutions to the data.

18. The system of claim 16 wherein the memory chips comprise flash memory chips.

19. The system of claim 16 further comprising an input interface that is operably coupled to the corrector module and to the channel controllers and that is arranged and configured to receive individual error correction requests to correct data from the multiple channel controllers and that is configured to receive error correction information corresponding to the error correction requests.

20. The system of claim 19 wherein the input interface comprises:
    a buffer that is arranged and configured to store the error correction request from the channel controllers; and
    the combiner logic circuitry.

21. The system of claim 16 further comprising an output interface that is operably coupled to the corrector module and to the channel controllers and that is arranged and configured to communicate the correction solutions to the channel controllers.

22. The system of claim 21 wherein the output interface comprises the expander logic circuitry.

23. The system of claim 16 wherein the channel controllers and the corrector module are a part of a field programmable gate array (FPGA) controller.

24. A data storage device, comprising:
    multiple flash memory chips; and
    a controller that is operably coupled to the flash memory chips and that is arranged and configured to receive commands from a host, wherein the controller comprises:
        combiner logic circuitry that is arranged in a tree structure and that is configured to serialize the individual error correction requests into a single request stream;
        a corrector module that is arranged and configured to perform error correction on the single request stream using an error correction algorithm to generate correction solutions responsive to errors in data being written to or read from the flash memory chips, wherein the correction module is a shared resource for the flash memory chips; and
        expander logic circuitry that is arranged and configured to de-serialize the correction solutions and to broadcast the correction solutions.

25. The data storage device of claim 24 wherein the controller is a field programmable gate array (FPGA) controller.

26. The data storage device of claim 24 further comprising:
    multiple channel controllers, wherein each of the channel controllers is arranged and configured to control operations associated with one or more of the flash memory chips and each of the channel controllers comprises an error encoder module that is arranged and configured to calculate error correction codes and an error detector module that is arranged and configured to detect the errors in data written to or read from the flash memory chips and to send error correction requests to the corrector module.

27. The data storage device of claim 26 wherein each of the channel controllers further comprises a channel corrector module that is arranged and configured to receive the correction solution from the expander logic circuitry and to apply the correction solutions to the data.

28. The data storage device of claim 24 further comprising:
    a memory board on which the flash memory chips are arranged and configured into multiple channels, with each of the channels being associated with one or more of the flash memory chips; and
    a controller board that is operably connected to the memory board, wherein the controller board comprises:
        an interface; and
        the controller that is arranged and configured to receive the commands from the host using the interface.

29. The data storage device of claim 28 wherein:
    the interface is a PCI-e interface; and
    the controller is a field programmable gate array (FPGA) controller.

30. The data storage device of claim 24 further comprising:
    two memory boards on which the flash memory chips are arranged and configured into multiple channels, with each of the channels being associated with one or more of the flash memory chips; and
    a controller board that is operably connected to the memory boards, wherein the controller board comprises:
        an interface; and
        the controller that is arranged and configured to receive the commands from the host using the interface, wherein the memory boards are each separately removable from the controller board.

* * * * *